United States Patent [19]
Ruetz

[11] Patent Number: 5,438,649
[45] Date of Patent: Aug. 1, 1995

[54] COLOR PRINTING METHOD AND APPARATUS WHICH COMPENSATES FOR ABNEY EFFECT

[75] Inventor: Brigitte Ruetz, San Bruno, Calif.

[73] Assignee: Canon Information Systems, Inc., Costa Mesa, Calif.

[21] Appl. No.: 967,050

[22] Filed: Oct. 28, 1992

Related U.S. Application Data

[63] Continuation-in-part of Ser. No. 956,300, Oct. 5, 1992.

[51] Int. Cl.⁶ .............................................. G06F 15/00
[52] U.S. Cl. ..................................... 395/109; 358/518
[58] Field of Search ............... 395/109, 131; 358/515, 358/516, 517, 518, 519, 520

[56] References Cited

U.S. PATENT DOCUMENTS

| | | | |
|---|---|---|---|
| 4,477,833 | 10/1984 | Clark et al. | 358/80 |
| 4,758,885 | 7/1988 | Sasaki et al. | 358/80 |
| 4,941,038 | 7/1990 | Walowit | 358/80 |
| 4,967,379 | 10/1990 | Ott | 364/526 |
| 5,107,332 | 4/1992 | Chan | 358/80 |
| 5,185,661 | 2/1993 | Ng | 358/75 |
| 5,212,546 | 5/1993 | Arazi et al. | 358/518 |
| 5,237,409 | 8/1993 | Yamaguchi | 358/133 |

FOREIGN PATENT DOCUMENTS

| | | |
|---|---|---|
| 264281 | 4/1988 | European Pat. Off. . |
| 321983 | 6/1989 | European Pat. Off. . |
| 448250 | 9/1991 | European Pat. Off. . |
| 486311 | 5/1992 | European Pat. Off. . |
| 488655 | 6/1992 | European Pat. Off. . |
| 2213674 | 8/1989 | United Kingdom . |

OTHER PUBLICATIONS

"Color Gamut Matching For Hard Copy", J. Meyer, et al., 1989 SID International Symposium, Digest of Technical Papers, vol. 20, May 18, 1989, pp. 86–89.

*Primary Examiner*—Mark R. Powell
*Assistant Examiner*—Tracy M. Legree
*Attorney, Agent, or Firm*—Fitzpatrick, Cella, Harper & Scinto

[57] ABSTRACT

Method and apparatus for color printing according to a printer table in which the hue angle of the colors in the printer table are warped so as to compensate for the Abney effect. A color printer gamut edge is first determined through printer gamut measurement, and color primary values within the printer gamut and outside the printer gamut are calculated and inserted into the printer table. If desired, a border table may be provided for colors outside the printer table. The hue angles for the printer table and the border table are then warped, for example, by stretching some ranges of hue angles and by compressing other ranges of hue angles, so that out-of-gamut colors are printed with a hue that is perceived to be the same as the hue of the desired color.

43 Claims, 14 Drawing Sheets

Microfiche Appendix Included
(43 Microfiche, 1 Pages)

COLOR PRINTING METHOD AND APPARATUS WHICH COMPENSATES FOR ABNEY EFFECT

RELATED APPLICATIONS

This application is a continuation-in-part of application Ser. No. 956,300, filed Oct. 5, 1992, by Brigitte Ruetz and entitled "Method And Apparatus For Printing High Fidelity Color Reproductions Of Colors Displayed On A Monitor", the contents of which are incorporated by reference as if set forth here in full.

BACKGROUND OF THE INVENTION

This application is being filed with a microfiche appendix of computer program listings consisting of one (1) fiche having forty one (43) frames.

A portion of the disclosure of this patent document contains material which is subject to copyright protection. The copyright owner has no objection to the facsimile reproduction by anyone of the document or the patent disclosure, as it appears in the Patent and Trademark Office patent file or records, but otherwise reserves all copyright rights whatsoever.

1. Field of the Invention

The present invention pertains to a method and apparatus for building and using look-up tables which determine the colors that a color printer prints in response to requests to print specific colors. The specific colors requested to be printed may include colors that are not printable by the color printer. For those colors in particular, the hue angle of the printed color is warped from the hue angle of the requested color so as to compensate for the Abney effect and to preserve the perceived hue.

2. Description of the Related Art

Recently, as the availability of color monitors and color printers has increased, it is more and more commonplace for a computer user to view a full color image on a color monitor and then to request a full color printout of that image on a color printer.

However, color printers and color monitors form color images differently. Specifically, a color monitor is a light emitting device; colors are formed on color monitors by adding light from three color primaries, generally red, green and blue. Printed images, on the other hand, simply reflect ambient light; colors are perceived by the way ambient light is affected by three subtractive primaries, generally cyan, magenta and yellow (and sometimes black).

These processes are fundamentally different. As a result, the range of colors displayable on the monitor is different from the range of colors printable by a printer. FIG. 1 is the CIE 1931 chromaticity diagram showing the range (or "gamut") of colors displayable by a monitor (area "A") and the range (or "gamut") of colors printable by a printer (area "B"). As seen in FIG. 1, the range of colors displayable on a monitor is generally greater than the range of colors printable by a printer. This is because a monitor is a light emitting device and is able to display colors with greater saturation. There are, however, some low saturation areas such as at area 10 where a printed image, which is light-subtractive, has greater color range than a monitor.

Because of the difference between the ranges of printable and displayable colors, it has not heretofore been possible to print color images which are perceived as faithful reproductions of displayed color images. Specifically, it is simply not possible to print a color in areas like out-of-gamut area 11 which are outside the range "B" of printable colors. Accordingly, even though those colors may be seen on color monitors, they cannot be printed on a color printer.

In U.S. Pat. No. 4,941,038, out-of-gamut colors are adjusted to printable colors within the printer gamut by selecting the printable color which has the shortest vector distance from the unprintable color and which preserves the hue angle of the unprintable color. Experiments and observations on human color perception, however, have shown that a line representing a constant hue or color drawn from pure white out to the fully saturated color is not a straight line but rather is a curved line. The curvature of those lines (the so-called "Abney Effect") is shown in the chromaticity diagram of FIG. 2. For regions where the curvature of constant color lines is relatively low, like bluish-green region 18, preserving hue angle only slightly changes the perceived hue. Thus, preserving hue angle for the bluish-green out-of-gamut color 18a by extending the hue back to point 18b on the printer gamut edge 10 still prints a bluish-green color. But for regions where the curvature of constant color lines is relatively high, like purplish-blue region 19, preserving hue angle greatly affects perceived hue. Thus, preserving hue angle for the purplish-blue out-of-gamut color 19a by extending hue back to point 19b on the printer gamut edge 10 prints a color with a decidedly blue hue.

SUMMARY OF THE INVENTION

It is an object of the present invention to address the foregoing difficulties by warping the hue for out-of-gamut colors so as to compensate for the curved color lines of the Abney effect.

According to this aspect, the invention is a method for building a printer table and a border table which give CMY values that are printed in response to a command to print a color, and in which the hue angles of the colors are warped to preserve perceived hue and compensate for the Abney effect. Warping is accomplished in two steps. First, CMY values are derived for out-of-gamut colors in the printer and border tables by selecting a printable color on the printer gamut edge that has the same hue angle as the unprintable color. Then, the angles in the printer and border tables are warped so that the CMY values at an unwarped hue angle are transferred to a warped hue angle that preserves perceived hue. For example, to preserve blue hue, the warping stretches the blue hue angles and compresses the purple hue angles such that a command to print an out-of-gamut blue hue yields a printed color with a blue hue rather than a printed color with a purple hue. Preferably, both in- and out-of-gamut colors in the printer table are warped and not simply the out-of-gamut colors so as to preserve color smoothness in the printer table and avoid color discontinuities at the gamut edge.

In another aspect, the invention is a method and apparatus for color printing in which out-of-gamut colors are mapped to colors on the printer gamut edge at a hue angle which is warped so as to preserve perceived hue. According to this aspect, color printing is conducted by reference to two look-up tables, a printer table and a border table, which give CMY values in response to a command to print a color. The printer table gives CMY values for colors within the printer gamut as well as for some colors outside the printer gamut such as colors typically found in a typical color monitor. The border table gives CMY values for colors outside the printer table. The hue angles in both tables are warped so as to mimic the curved constant-color lines that characterize the Abney effect and thereby print out-of-gamut colors with the proper perceived hue.

This brief summary has been provided so that the nature of the invention may be understood quickly. A more complete understanding of the invention can be obtained by reference to the following detailed description of the preferred embodiment thereof in connection with the drawings which together form a complete part of the specification.

DETAILED DESCRIPTION OF THE PREFERRED EMBODIMENT

Figure 3:
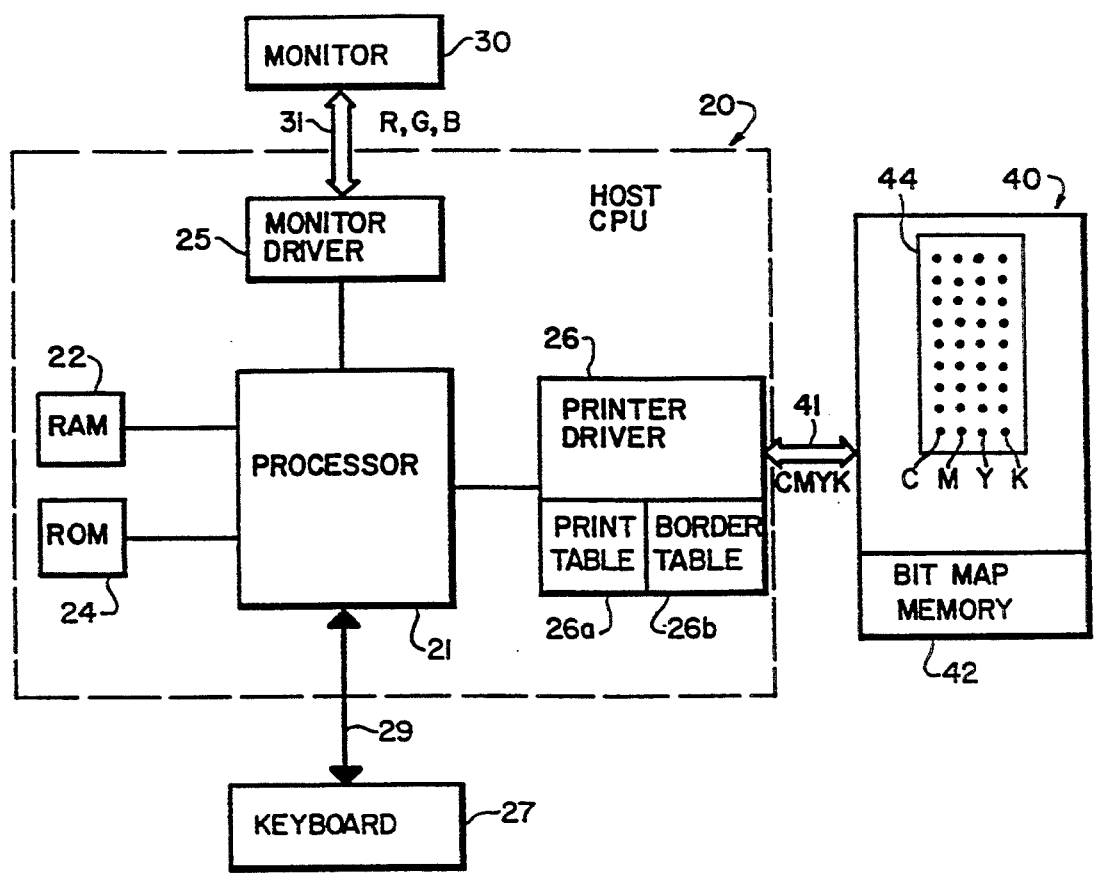
FIG. 3 is a block diagram of a printing apparatus according to the invention.

FIG. 3 is a block diagram of a printing apparatus according to the invention.

As shown in FIG. 3, the printing apparatus includes a host CPU 20, a color monitor 30 and a color printer 40. Host CPU 20 includes a processor 21 such as an 80286 microprocessor, a random access memory ("RAM") 22 which provides working storage area to processor 21, a read only memory ("ROM") 24 which provides static storage for processor 21, monitor driver 25 and a printer driver 26. Host CPU 20 is accessed by an operator via keyboard 27 which is connected through an interface 29 to processor 21. Using the keyboard, an operator can cause processor 21 to execute stored program instructions which cause color images to be displayed on monitor 30 and which cause corresponding color images to be printed on color printer 40.

Other peripheral devices, such as disk drives, tape drives, color video interfaces, color scanner interfaces, etc., may be provided for host CPU 20 but those other devices are not shown in the interest of simplicity. In cooperation with the stored program instructions executed by processor 21, such devices permit, for example, a color image to be scanned into RAM 22 and displayed on monitor 20, the colors in the image to be manipulated, and the resulting image to be printed on printer 40.

In accordance with stored program instructions, processor 21 derives a color image for display on monitor 30. Processor 21 provides the color image to monitor driver 25 which in turn derives RGB values for each pixel in monitor 30. The RGB values are provided via interface 31 to the monitor 30 where those values are displayed.

Upon request, processor 21 also feeds a color image to printer driver 26 for printing by color printer 40. Printer driver 26 derives CMY values for each pixel of the color image based on the color values provided from processor 21. The CMY values are determined in accordance with either a printer table 26a or a border table 26b. The printer table 26a is a table which provides CMY values for all colors that are printable by printer 40. The border table 26b is a table which provides suitable CMY values for colors that are not printable by printer 40. The printer table may also include CMY values for some unprintable colors so as to smooth the transition from printable to unprintable colors. In addition, a black (hereinafter "K") value may also be derived. The CMYK values are fed via interface 41 to printer 40 where they are stored in bit map memory 42 within printer 40. The bit map memory 42 may store a full bit map image of the printed image or it may store only a band or partial bit map image. When sufficient color data is stored in bit map memory 42, a color printer head 44 reciprocates across a platen adjacent to a sheet of paper. In the present embodiment, print head 44 includes 32 ink jet nozzles arranged in a four column by eight row pattern. The nozzles in the first column all eject droplets of cyan ink; the nozzles in the second column all eject droplets of magenta ink; the nozzles in the third column all eject droplets of yellow ink; and the nozzles in the fourth column all eject droplets of black ink. The nozzles are controlled independently in accordance with the color data in bit map memory 42 such that in one reciprocation of print head 44 across the platen, eight rows of pixels are printed.

Figure 4:
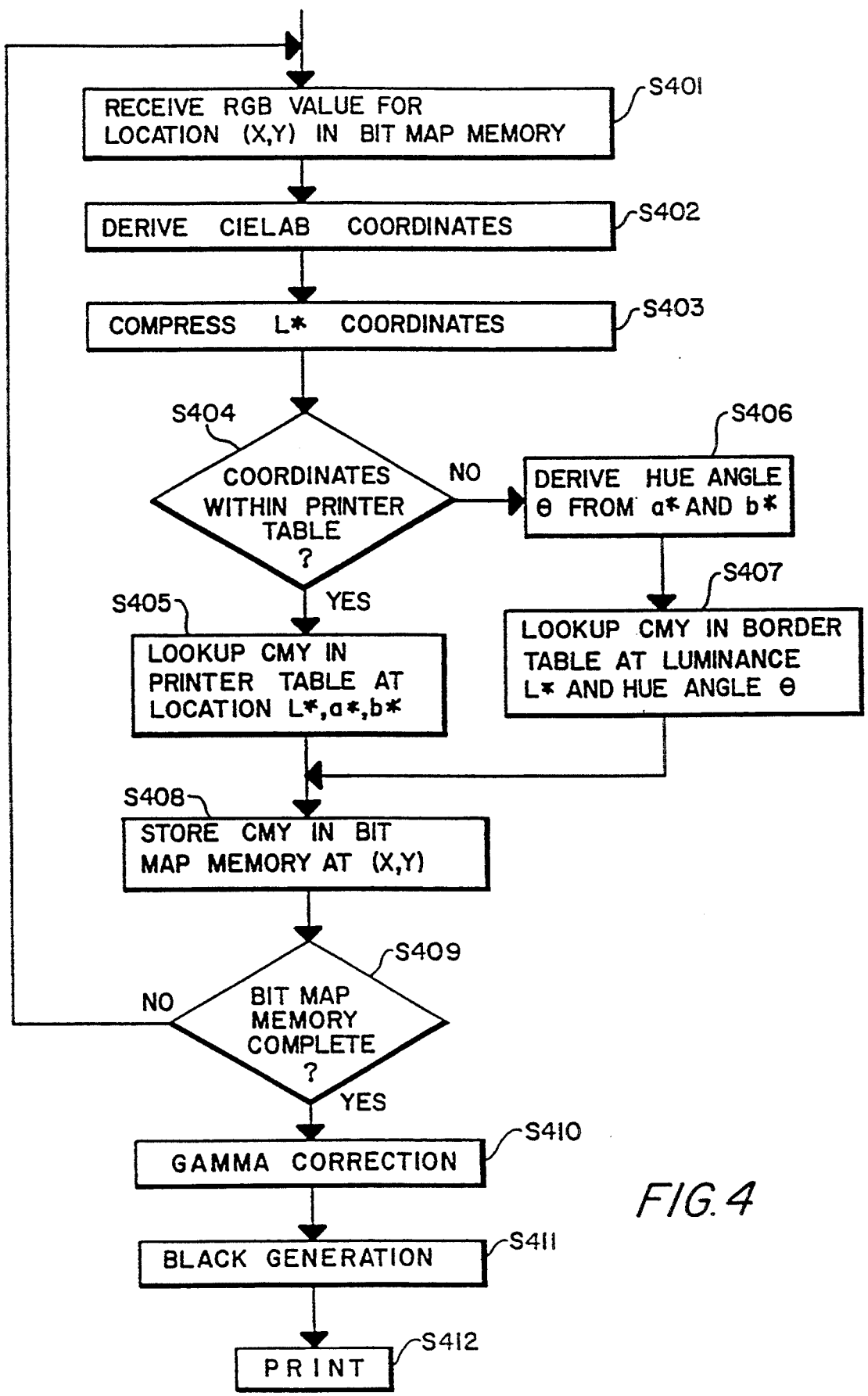
FIG. 4 is a flow diagram showing how a printer driver in the FIG. 3 apparatus selects CMYK values for a color printer.

FIG. 4 is a flow diagram showing how printer driver 26 selects CMYK values from the color data provided by processor 21. In step S401, printer driver 26 receives RGB values for a location (x,y) in bit map memory 42. In step S402, printer driver 26 derives device independent color coordinates from the RGB value. Preferably, the device independent coordinates are CIELAB coordinates. This is because the coordinates in CIELAB space are perceptually uniform such that equal-sized intervals anywhere in CIELAB space correspond to equal-sized changes in perceived color. Moreover, since CIELAB space can be viewed in cylindrical coordinates in terms of hue, saturation and luminance, it is an intuitive space which is amenable to defining gamut maps.

In step S403, the luminance coordinate is compressed at the extremes of the $L^*$ axis in CIELAB space. Compression step S403 may be performed explicitly by mathematical manipulation of the $L^*$ value from step S402 or implicitly by storing modified CMY values in the printer table and the border table. If performed implicitly, which is preferable in some instances, then both the printer table and the border table store precompressed values. More particularly, the printer table and border table can be arranged so that the values stored at, for example, luminance $L^*=99$ actually correspond to a luminance of $L^*=94$. Likewise, values stored at, say, luminance $L^*=7$ actually correspond to a luminance of $L^*=26$. Values in the center of the luminance range, from for example $L^*=38$ through 90, remain unmodified. This arrangement results in luminance compression without the need for explicit compression.

While compression step S403 is optional, it is nevertheless preferable to perform since it ensures that colors at extreme values of luminance are printed with perceptible changes in luminance. More particularly, because monitor 30 displays colors with light emitting elements, it can display colors with higher values of luminance than those achievable by printer 40, whose highest value of luminance is limited by the whiteness of the paper upon which the color image is formed. Further still, since monitor 30 can completely turn off its light emitting elements, it can display colors with lower values of luminance than those printable by printer 40, since even black ink reflects some ambient light. Accordingly, to ensure that some color is printed, even at the highest and lowest luminance values, it is preferable to compress the luminance values determined in step S402 into a range that is printable by printer 40.

In step S404, the $L^*$, $a^*$ and $b^*$ coordinates derived in steps S402 and S403 are inspected to determine whether they fall within the range covered by printer table 26a. If the $L^*$, $a^*$, $b^*$ coordinates are within the range covered by printer table 26a, then flow advances to step S405 which looks up the corresponding CMY values in printer table 26a at location $L^*$, $a^*$, $b^*$, (actually, the nearest location since only discrete values of $L^*$, $a^*$ and $b^*$ are stored). On the other hand, if the $L^*$, $a^*$, $b^*$ coordinates are not within printer table 26a, then flow advances to step S406 in which the hue angle $\theta$ is derived from the $a^*$ and $b^*$ values according to the following formula:

$$\theta = \arctan (b^*/a^*)$$

Flow then advances to step S407 which looks up corresponding CMY values in border table 26b at the nearest location which corresponds to the luminance $L^*$ and the hue angle derived in step S406.

In either event, flow then advances to step S408 in which the CMY values are stored in bit map memory 42 at location (x,y). If desired, the CMY values may be modified before storage, for example, by interpolation, so as to accommodate the difference between the actual $L^*$, $a^*$, $b^*$ values stored in the tables and the desired values calculated above.

In step S409, printer driver 26 determines whether the bit map memory has been completed. If the bit map memory has not been completed, then flow returns to step S401 in which the next RGB value is received for the next location (x,y) in bit map memory. On the other hand, if the bit map memory has been completed, or if a sufficient area of the bit map memory has been completed (such as an eight row long band corresponding to the eight rows of ink jet nozzles in head 44), then flow advances to step S410 where gamma correction is performed. Gamma correction adjusts the CMY values in bit map memory so as to achieve a uniform distribution of luminance. In step S411, undercolor removal is performed so as to derive the black value for location (x,y) in bit map memory. Undercolor removal in the present embodiment may be performed by the simple expedient of selecting the minimum value of CMY and assigning that value to the black value. Then, each of the CMY values is adjusted by subtracting the black value from it.

The order of steps S410 and S411 is not critical and those steps may be switched, for example to accommodate a particular color printing technique such as continuous tone, dither techniques or error diffusion.

In step S412, color printing is initiated using the resulting CMYK values.

Figure 5B:
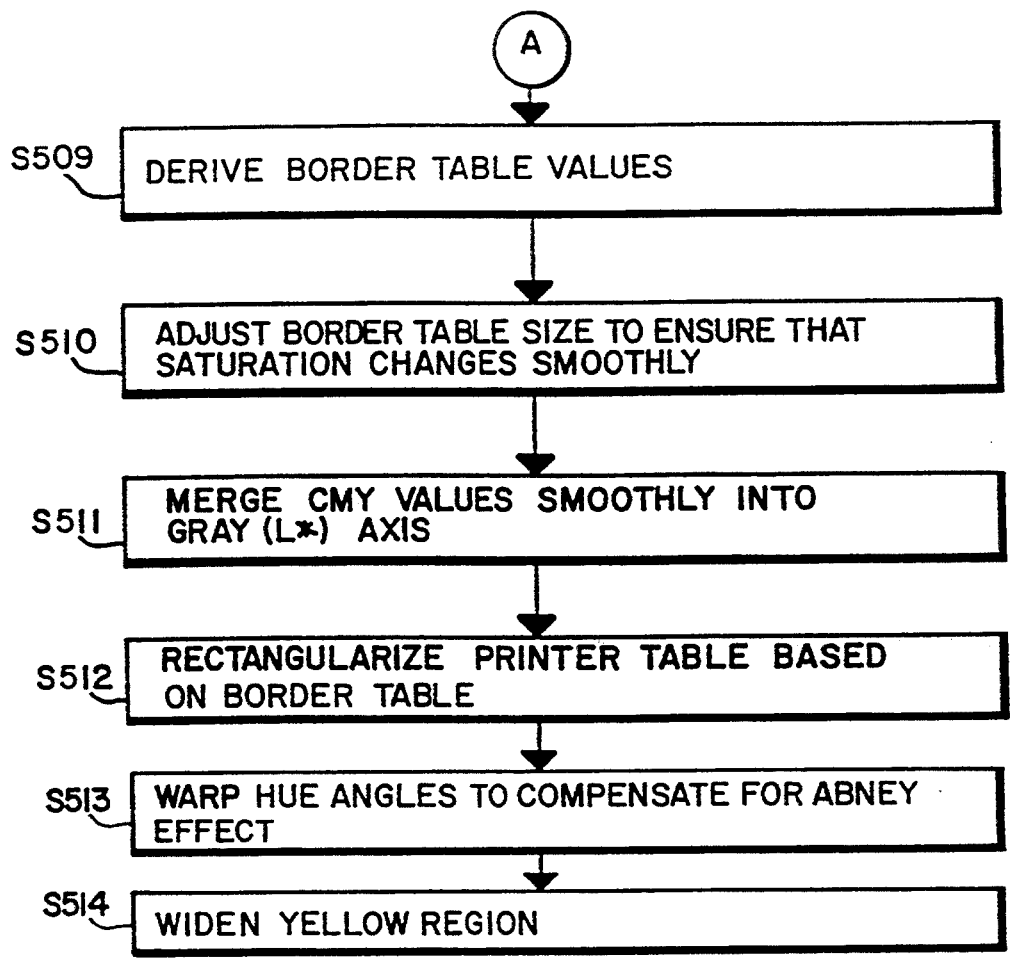
FIG. 5 a flow diagram for describing how the printer table and the border table are constructed.
Figure 5:
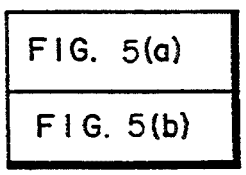
Figure 5A:
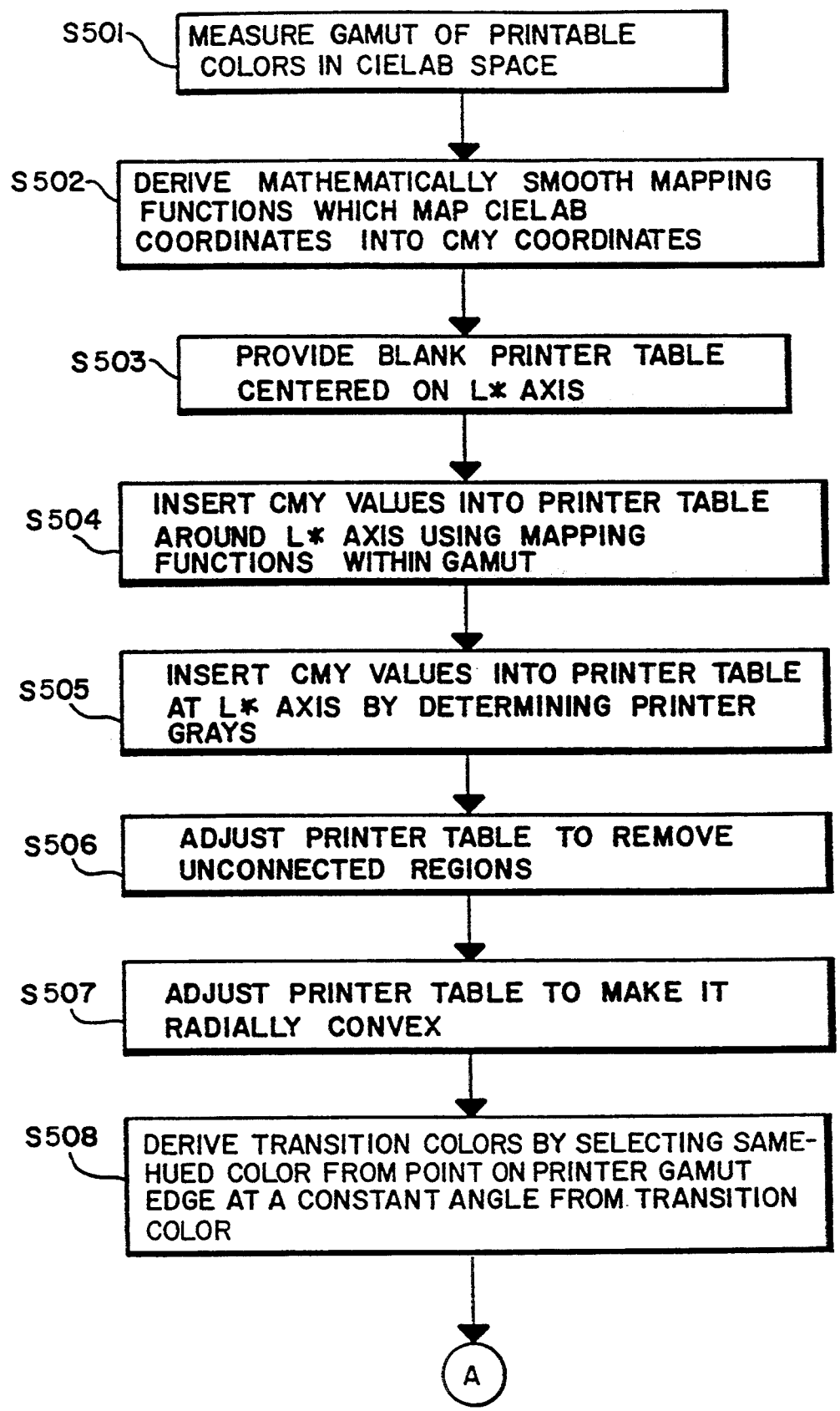

FIG. 5 is a flow diagram for describing how the printer table 26a and the border table 26b are constructed. The flow procedures shown in FIG. 5 need only be performed once for each printer, or once whenever it is desired to recalibrate each printer. More preferably, the flow procedures of FIG. 5 are performed only once for a class of printers, such as printers of the same model number, and are provided in software to an operator as part of a factory calibration of the printer.

In step S501, the gamut or range of colors printable by printer 40 is measured. Preferably, this is achieved by printing a very large subset, or a complete set, of all colors printable by printer 40. For example, in the printer used in the present embodiment, each of the CMY and K values may be printed in 65 gradations ranging numerically from 0 through 64. A subset of about one quarter of those values, for each color, are printed. Thus, for example, 17 C values are printed, namely numerical values 0, 4, 8, 12, . . . 64, and 17M values are printed, and 17 Y values are printed. All possible combinations of those 17 CMY values are printed, yielding $17 \times 17 \times 17 = 4,913$ color patches.

In addition to the foregoing hued colors, all possible gray values, in this case 48 additional gray values over the 17 already printed, are also printed.

With the foregoing sampling of the printer gamut, it will be seen that pure gray colors are printed together with hued colors. Whatever method of sampling is used, this property of pure gray printing should be preserved since proper gray reproduction is a desirable property in color reproduction.

The color of each of the 4,913 color patches and 48 additional gray patches is measured in a device independent color space such as the aforementioned CIELAB color space. Thus, at the end of step S501, for each of the $4,913+48=4,961$ unique CMY color combinations, $L^*$, $a^*$ and $b^*$ coordinates are measured thereby defining the printer gamut.

Step S502 derives mathematically smooth functions which map the CIELAB coordinates into CMY coordinates. In the present embodiment, a cubic least squares fit from CIELAB space into CMY space was chosen. That is, using well-known least squares fitting techniques, coefficients $c_0$ through $c_{19}$, $m_0$ through $m_{19}$, and $Y_0$ through $Y_{19}$ were derived to give the best fit, in the least squared sense, to the gamut measured in step S501:

$$C = c_0 + c_1 L^* + c_2 a^* + c_3 b^* + c_4 L^{*2} + c_5 a^{*2} + \quad (1)$$
$$c_6 b^{*2} + c_7 L^* a^* + c_8 L^* b^* + c_9 a^* b^* + c_{10} L^{*3} + c_{11} a^{*3} +$$
$$c_{12} b^{*3} + c_{13} L^{*2} a^* + c_{14} L^* a^{*2} + c_{15} L^{*2} b^* + c_{16} L^* b^{*2} +$$
$$c_{17} a^{*2} b^* + c_{18} a^* b^{*2} + c_{19} L^* a^* b^*$$

$$M = m_0 + m_1 L^* + m_2 a^* + m_3 b^* + m_4 L^{*2} + m_5 a^{*2} + \quad (2)$$
$$m_6 b^{*2} + m_7 L^* a^* + m_8 L^* b^* + m_9 a^* b^* + m_{10} L^{*3} +$$

$$m_{11}a^{*3} + m_{12}b^{*3} + m_{13}L^{*2}a^* + m_{14}L^*a^{*2} +$$

$$m_{15}L^{*2}b^* + m_{16}L^*b^{*2} + m_{17}a^{*2}b^* + m_{18}a^*b^{*2} + m_{19}L^*a^*b^*$$

$$Y = y_0 + y_1L^* + y_2a^* + y_3b^* + y_4L^{*2} + y_5a^{*2} + \quad (3)$$

$$y_6b^{*2} + y_7L^*a^* + y_8L^*b^* + y_9a^*b^* + y_{10}L^{*3} +$$

$$y_{11}a^{*3} + y_{12}b^{*3} + y_{13}L^{*2}a^* + y_{14}L^*a^{*2} +$$

$$y_{15}L^{*2}b^* + y_{16}L^*b^{*2} + y_{17}a^{*2}b^* + y_{18}a^*b^{*2} + y_{19}L^*a^*b^*$$

In step S502, any mathematical function which fits the measurements taken in step S501 from the device independent coordinate space to CMY coordinate space may be used. Preferably, however, the mapping function includes smoothing so as to eliminate measurement irregularities that may have been encountered in step S501.

It may, in addition, be preferable to weight some of the points measured in step S501 prior to deriving mapping in step S502. For example, proper skin tone color reproduction is an important property of color printers. Accordingly, it may be desirable, in some circumstances, to weight colors in the area of skin tone colors more heavily than other colors.

Figure 1:
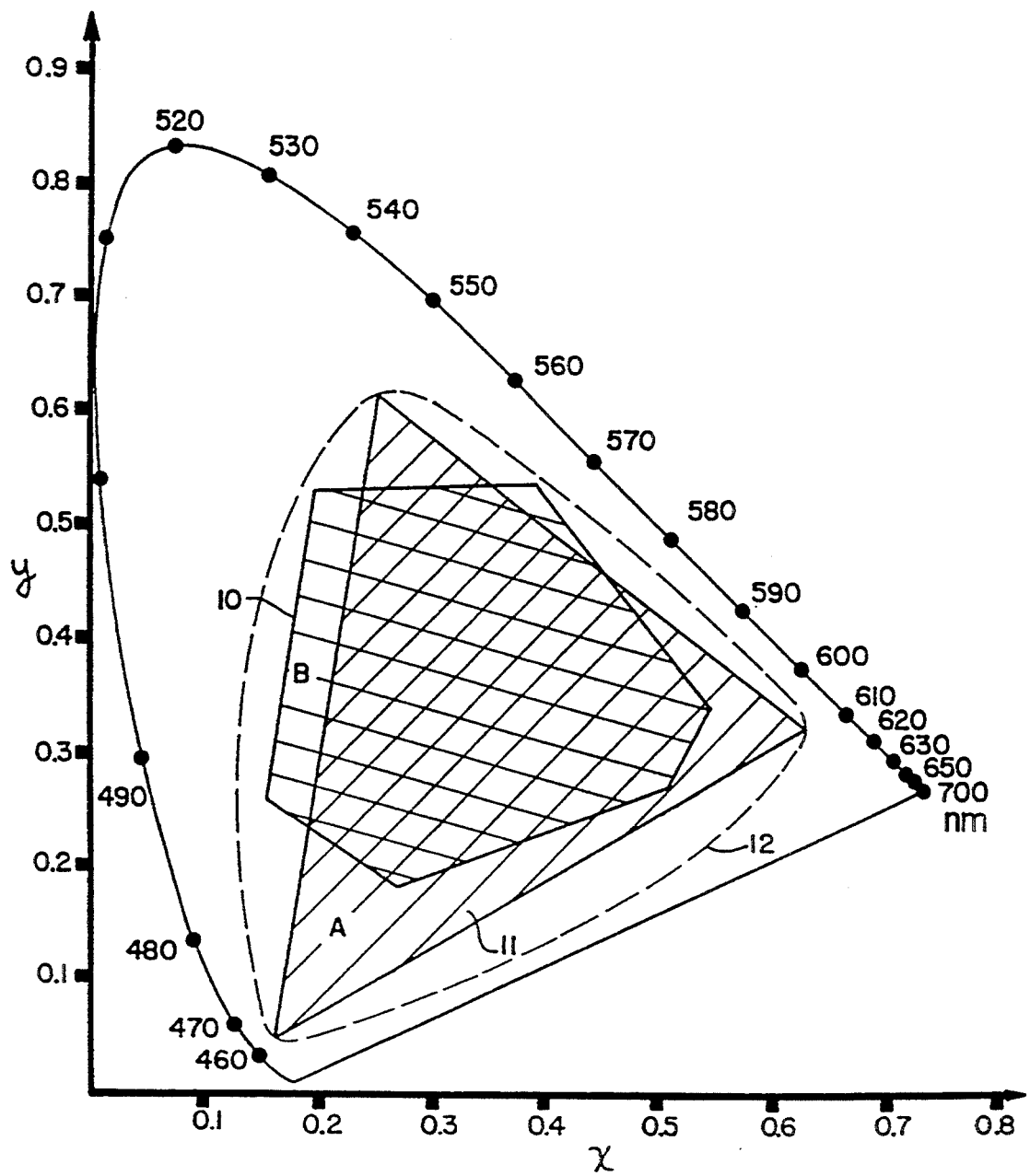
FIG. 1 is a chromaticity diagram showing how the gamut of colors printable on a printer is related to the gamut of colors displayable on a monitor.

In step S503, the device independent space, namely CIELAB space, is divided into equally sized intervals, one of the intervals including the L* axis such as by being centered at the L* axis, thereby providing a blank printer table. The size of the printer table preferably includes both the printer gamut as well as the gamut of a typical color monitor. For example, referring to FIG. 1, the printer table preferably includes the color area indicated generally at 12. The size of the intervals in the printer table should be made as small as possible giving due consideration to storage limitations for the printer table. Thus, for example, it has been found ° that fine luminance gradations are more important than fine hue and saturation gradations. It has been determined that dividing the luminance axis into intervals of $\Delta L^* = 1$ (luminance L* ranges from 0 through 100) provides adequate luminance gradation. On the other hand, such fine gradations are not ordinarily needed in hue, and therefore $\Delta a^* = \Delta b^* = 3$ has been found to yield adequate hue gradations (a* and b* range from about $-100$ through $+100$ near the center (L*=50) of the luminance axis).

Figure 6:
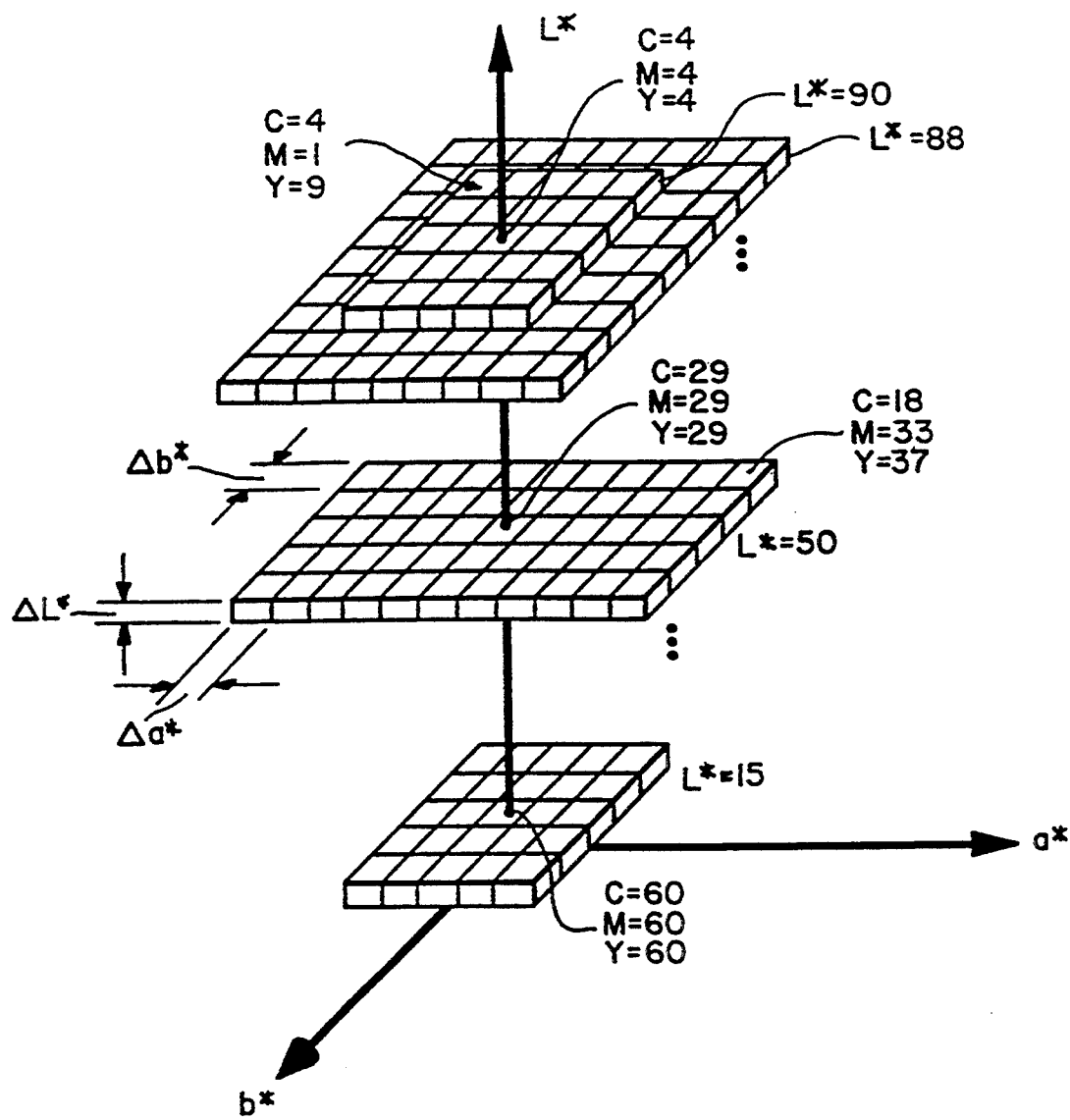
FIG. 6 illustrates a typical division of CIELAB space into a printer table.

In addition to the foregoing considerations, it should also be observed that the printer gamut is not the same for each luminance value. Specifically, the gamut is relatively smaller at luminance extremes and relatively larger at the center of the luminance axis. FIG. 6 illustrates a typical division of CIELAB space into a printer table, although all luminance and hue gradations have not been shown to simplify the presentation. At relatively low luminance values such as L*=10, a relatively small rectangular grid in the a* and b* axes is adequate to map the printer gamut. Similarly, at relatively high luminance values, such as L*=90, a relatively small rectangular grid in the a* and b* axes is also adequate to store the printer gamut. However, at intermediate luminance values, such as that at L*=50, a relatively larger rectangular grid in the a* and b* axes is required to map the printer gamut.

As further shown in FIG. 6, the rectangular grid at each luminance level includes the L* axis (in FIG. 6 it is centered on the L* axis). That is, there is a cell in the rectangular grid that corresponds exactly to a*=b*=0.

That central point, namely a*=b*=0, corresponds to a pure gray color which, as mentioned above, is desirably reproduced as a pure gray color for proper color reproduction.

In practice, it is also preferable to include more colors in the printer table than are in the printer gamut, and most preferably also to include the colors that are found in a typical monitor's gamut. This permits the printer table to include transition values which smooth the transition from colors at the edge of the printer gamut to colors in the border table and which preserve color differentiation in areas outside the printer gamut.

In step S504, C, M and Y values are inserted into the printer table around the L* axis using the mapping functions derived in step S502. For digital color printing as opposed to continuous tone printing, fractional C, M and Y values are truncated or rounded to integral values. The entire rectangular grid at each luminance level is not completely filled, but rather only those points known to be within the printer gamut. In addition, the points exactly on the L* axis, namely those points at a*=b*=0, are also not mapped by the mapping functions. Rather, CMY values for those points are inserted in step S505 by determining printer grays measured in step S501 with corresponding L* values. This ensures that the smoothing introduced by the mapping functions does not introduce hue into pure gray values.

Figure 7:
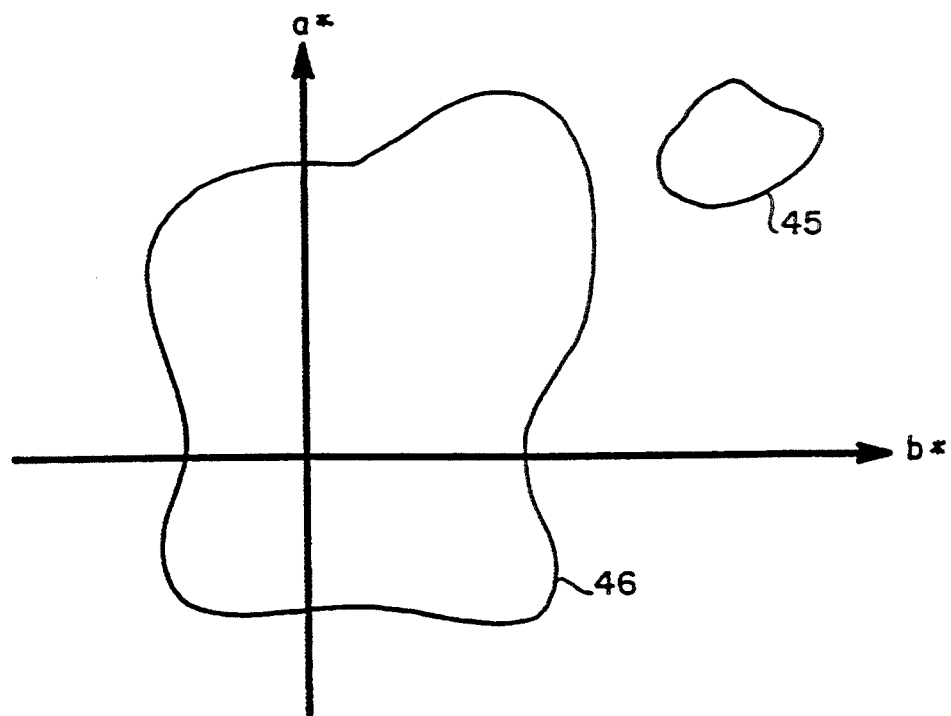
FIG. 7 shows how unconnected regions are removed from the printer table.

In steps S506 and S507, the CMY values in the printer table are adjusted for unprintable colors. Unprintable colors may arise because of artifacts introduced by the mapping function selected in step S502. For example, the mapping function used may give rise to false regions in the printer table, such as region 45 in FIG. 7, which is not within the printer gamut 46. These artifacts are removed in step S506 by removing all regions that are not connected to the region around the L* axis.

Figure 8:
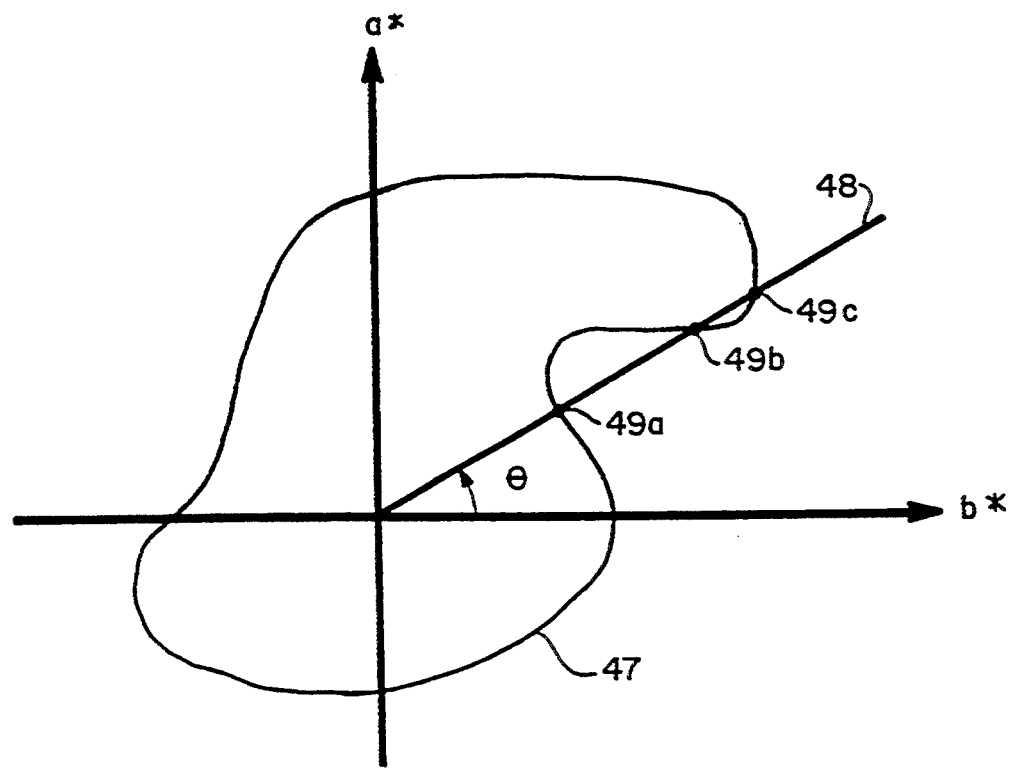
FIG. 8 shows radially concave regions in the printer gamut and FIG. 9 illustrates how to remove concavities by making the printer table radially convex.

Unprintable colors may also arise from the situation shown in FIG. 8 in which 47 designates the edge of the printer gamut for an arbitrary luminance value L*. The printer gamut shown there is not radially convex because each and every radial line from the L* axis does not intersect edge 47 at one and only one point. In particular, radial line 48 intersects edge 47 at three points 49a, 49b and 49c. The region between points 49a and 49b is a radial concavity and can cause the generation of inappropriate CMY values in the printer table. Accordingly, in step S507, the values in the printer table are adjusted to make them radially convex.

Figure 9:
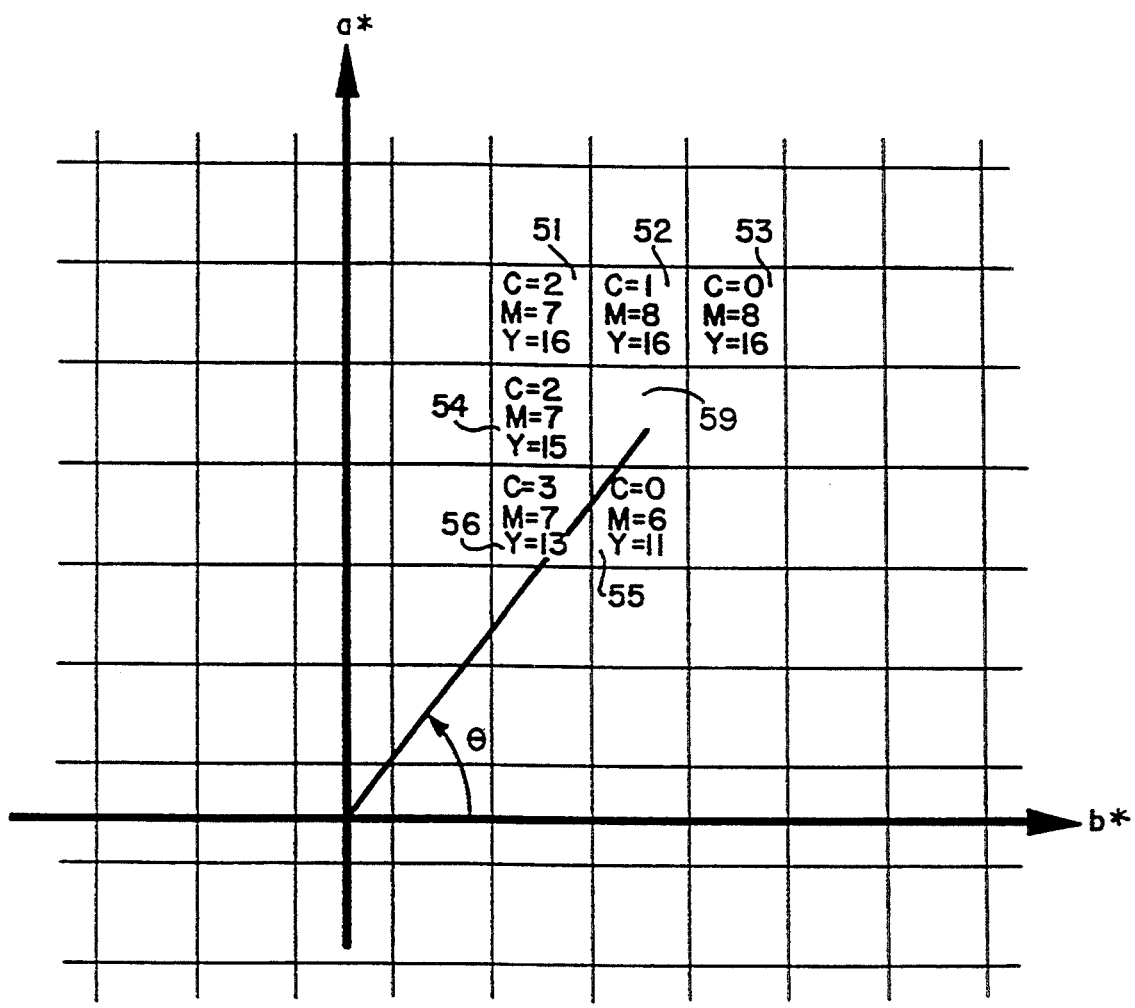

FIG. 9 illustrates this process. FIG. 9 shows the rectangular grid in the a* and b* axis for an arbitrary luminance value L*. Cells 51 through 56 all include printable values within the printer gamut. However, cell 59 is a radially concave cell because the radial line at $\theta$ crosses two cells in the printer gamut (cells 53 and 56). Accordingly, a CMY value is assigned to cell 59 to make the table radially convex. The value is selected by preserving as much as possible the hue of the color (angle $\theta$ in FIG. 9) and by selecting a saturation value which is nearest to that desired. Thus, in FIG. 9, the value of cell 59 could be assigned a value near to the value of one of cells 51 through 56 in dependence upon which of cells 51 through 56 have the closer values of hue and saturation. In FIG. 9, C=1, M=18 and Y=14 has been selected.

Figure 10:
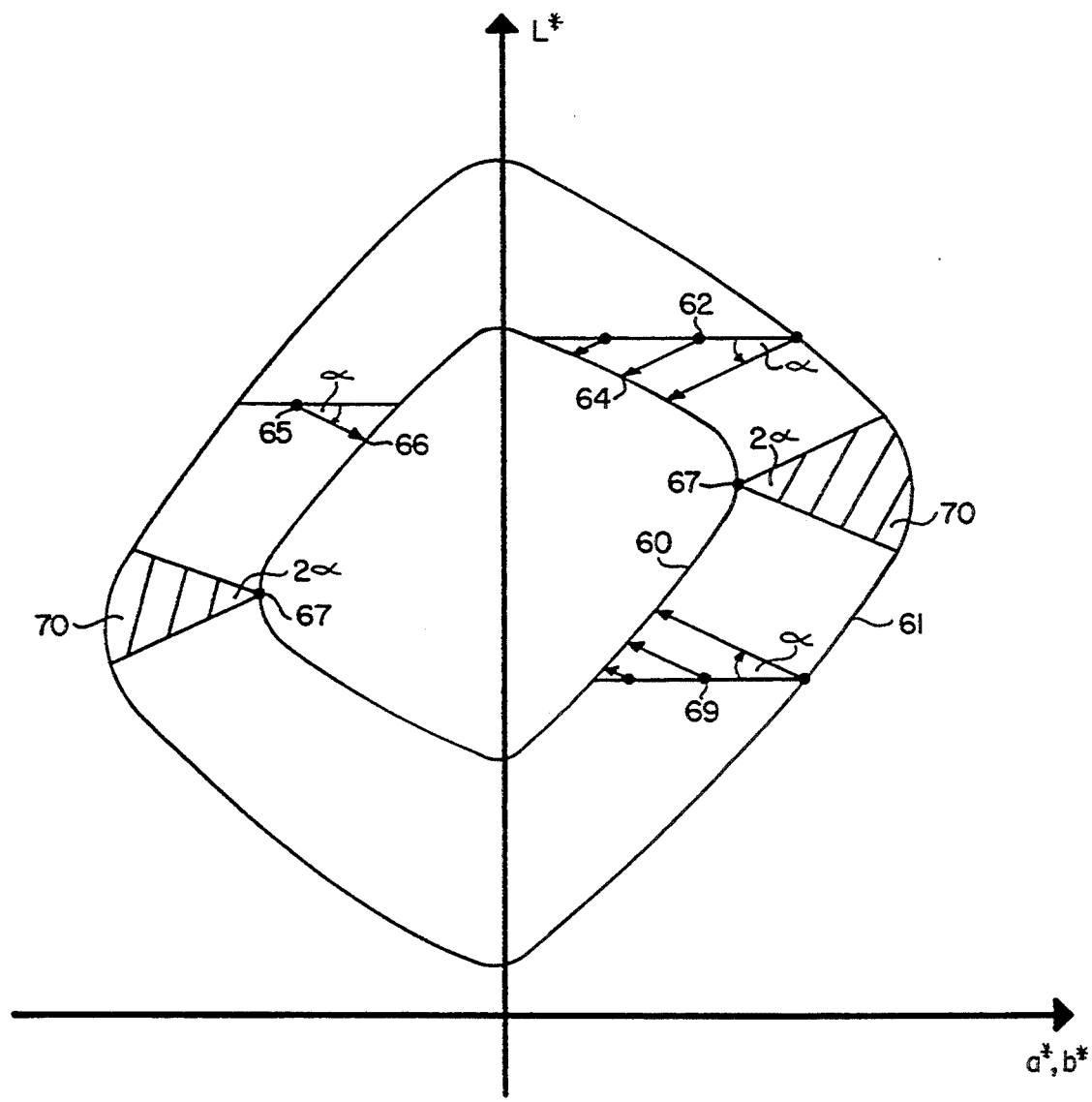
FIG. 10 shows how CMY values are selected for each cell in the transition region of the printer tables.

Step S508 derives transition colors for each printer table, and FIG. 10 shows how the CMY values for the transition colors are selected. In FIG. 10, 60 is the edge of the printer gamut and 61 is the edge of the printer tables which, as mentioned above, corresponds roughly to the edge of a typical color monitor. For each transition color in the region between edges 60 and 61, the color on the edge 60 of the printer gamut which lies at a constant angle α from the transition color is selected for the transition color. Any change in luminance is allowed, that is, the change in luminance is not limited to an arbitrary threshold. For example, for transition color 62 point 64 on the edge 60 of the printer gamut is selected because point 64 lies at an angle α from point 62. Likewise, for each point in the transition region, such as point 65, the corresponding point on the edge 60 the printer gamut which lies at a constant angle α is selected, here point 66. For transition colors above the maximum saturated point 67 of the printer gamut, the angle α extends downwardly; conversely, for transition colors below the maximum saturated point 67, such as color 69, the angle α extends upwardly. For transition colors in the wedge 70 subtended by the angle 2α from the maximum saturated point 67, the maximum saturated point 67 is selected. Thus, all colors in the wedge 70 are mapped to color 67.

To ensure maximal color smoothness for the transition colors between edges 60 and 61, the color saturation of the printer gamut edge 60 is preferably inspected before constant α angle extension to ensure that the color saturation increases monotonically from minimum saturation to the maximum saturation point and then decreases monotonically to minimum saturation. If non-monotonicity is found, then the color saturation at the printer gamut edge is adjusted before constant angle extension to remove the non-monotonicity.

An angle α=15° has been found to yield satisfactory results by allowing a pleasing increase in color saturation without unreasonably large changes in lightness. Other values of α, for example between 10° and 20°, may also be used.

Figure 11:
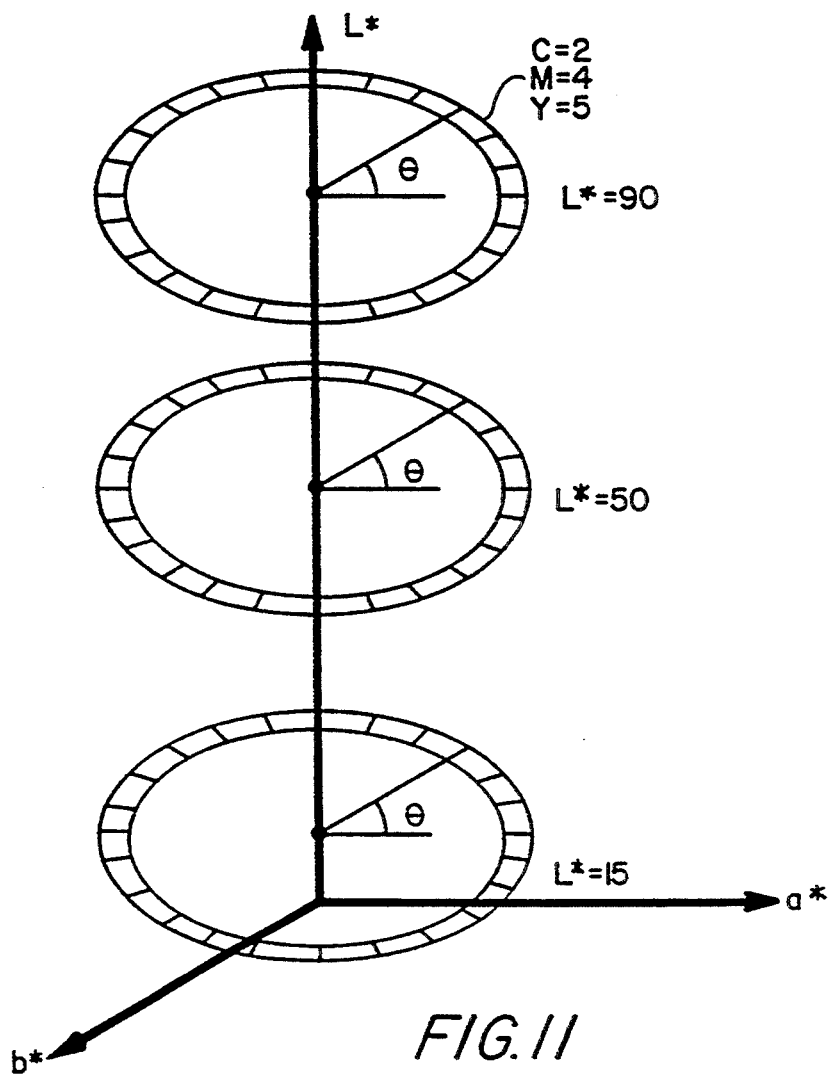
FIG. 11 illustrates the arrangement of border tables.

Step S509 derives the border table 26b. Whereas printer table 26a was arranged as a rectangular grid in the a*, b* axes for each luminance value, the border table is arranged in wheels with one wheel for each of the luminance values of the printer table. Thus, as shown in FIG. 11, a wheel-shaped border table is provided for each of the luminance values for which a printer table exists, which provides one border table in correspondence with each of the printer tables. The border tables contain plural cells which are accessed based on hue angle θ calculated as a function of the a* and b* coordinates, as follows:

$$\theta = \arctan(b^*/a^*)$$

Figure 12:
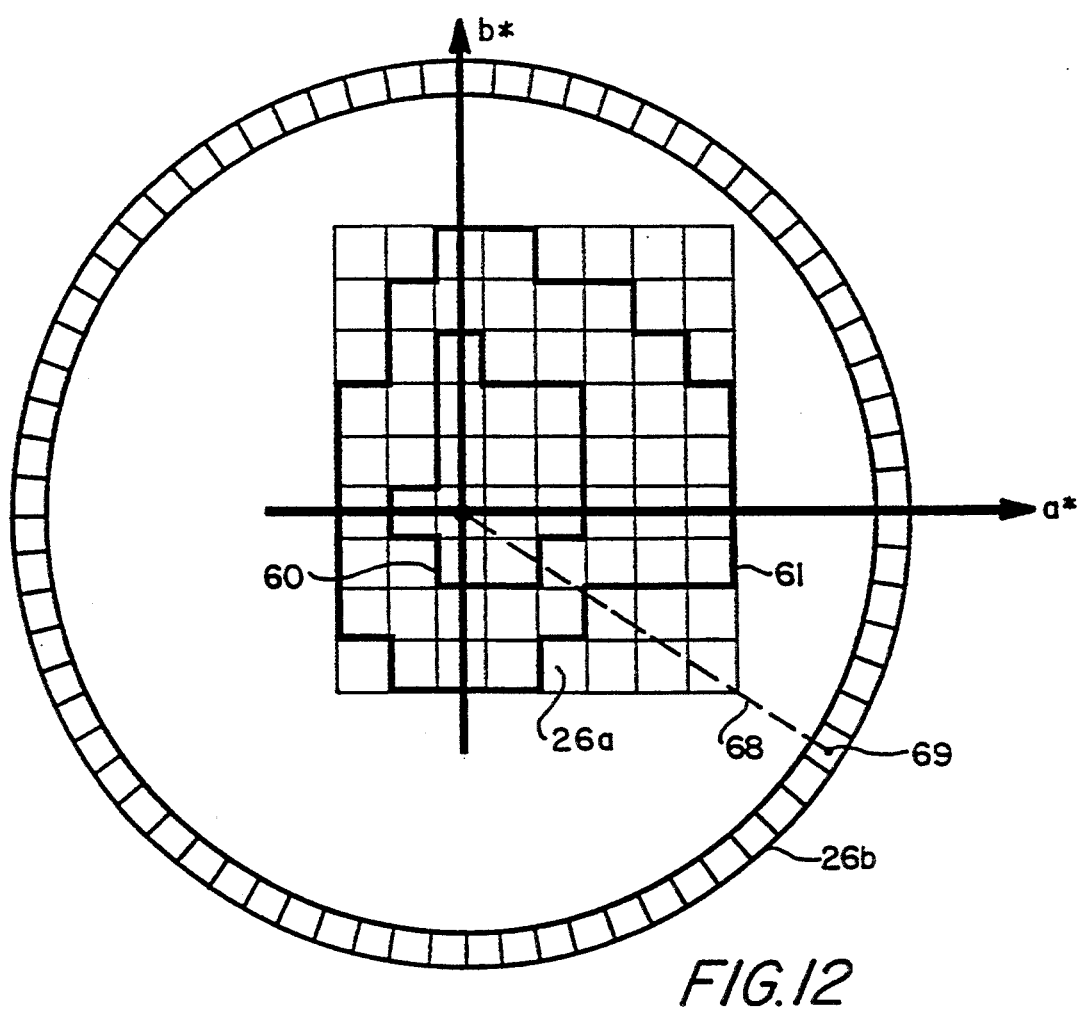
FIG. 12 shows the relation between the printer table and the border table in CIELAB space for an arbitrary luminance value $L^*$.

FIG. 12 shows the correspondence of border tables and printer tables. Whereas printer table 26a is a rectangular grid for an arbitrary luminance value L*, border table 26b is arranged as a wheel centered at a*=b*=0. Individual cells in the border table are accessed by the angle θ in the a* and b* axes which also corresponds to hue. Experimentally, it has been found that 1 degree increments, resulting in 360 cells in each border table, provides adequate gradation of hue, but this can be adjusted as described below in connection with FIG. 13.

Step S510 selects CMY values for each cell in the border tables in the same manner as for selecting CMY values for transition colors in the printer table. Thus, border table colors are selected from the printer edge color which lies at a constant angle α (which is the same α as used for the printer table) from the border table. As before, α extends upwardly or downwardly depending on whether the border table color is below or above the maximum printer saturation point, and is limited to the maximum printer saturation point when the border color table falls in wedge 70.

Figure 13:
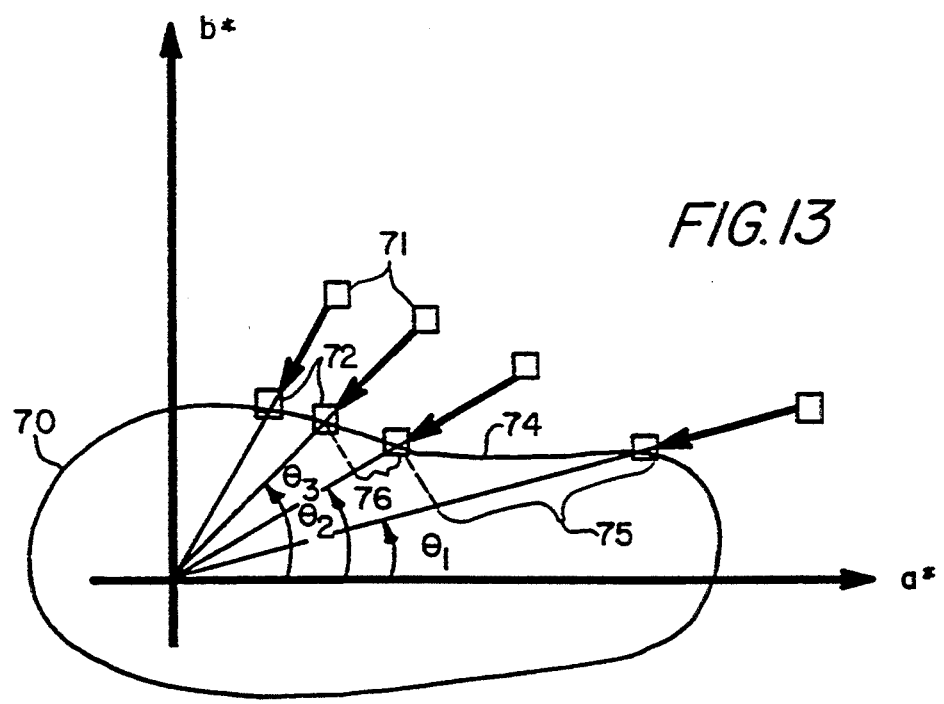
FIG. 13 shows the printer gamut at an arbitrary luminance value $L^*$ in the $a^*$ and $b^*$ axes.

In step S510, the border table values are inspected to ensure that the saturation of the colors in the border table changes smoothly. This situation is illustrated in FIG. 13 which shows the printer gamut 70 at an arbitrary luminance value L* in the a* and b* axes. As described above, colors such as color 71 which lie outside of the printer gamut are mapped to border color 72 of the printer gamut by preserving hue angle. Particularly in areas like area 74 where the printable saturation changes rapidly, small changes in hue can cause rapid changes in saturation in the border table. For example, as the hue angle changes from $\theta_1$ to $\theta_2$, there are relatively large changes in saturation for only a small change in hue. Such a large change in saturation, when printed, looks unnatural.

To avoid this unnatural look, the border table is increased in size until there are sufficiently fine increments to ensure that saturation changes smoothly. If the border table size is increased, then the calculations in step S509 are repeated to fill in CMY values for the new border table.

In step S511, the CMY values in the printer table are inspected and modified so as to ensure that they merge smoothly into the gray (L* axis). Specifically, at each discrete luminance level, the colors in the printer table that are close to the L* axis are redetermined so as to ensure that they converge smoothly to gray.

In step S512, the printer table is rectangularized. More specifically, until this step, CMY values have been inserted into the printer table only in areas within the printer gamut 60 (steps S504 and S505) and in the transition region 61 between the printer gamut and the border table (step S509). In step S512, the remaining cells of the printer table such as cells like 69 in FIG. 12 are filled out by calculating the hue angle for each blank cell that remains in the printer table and by inserting the border table color at that hue angle as illustrated at 68 in FIG. 12.

Figure 2:
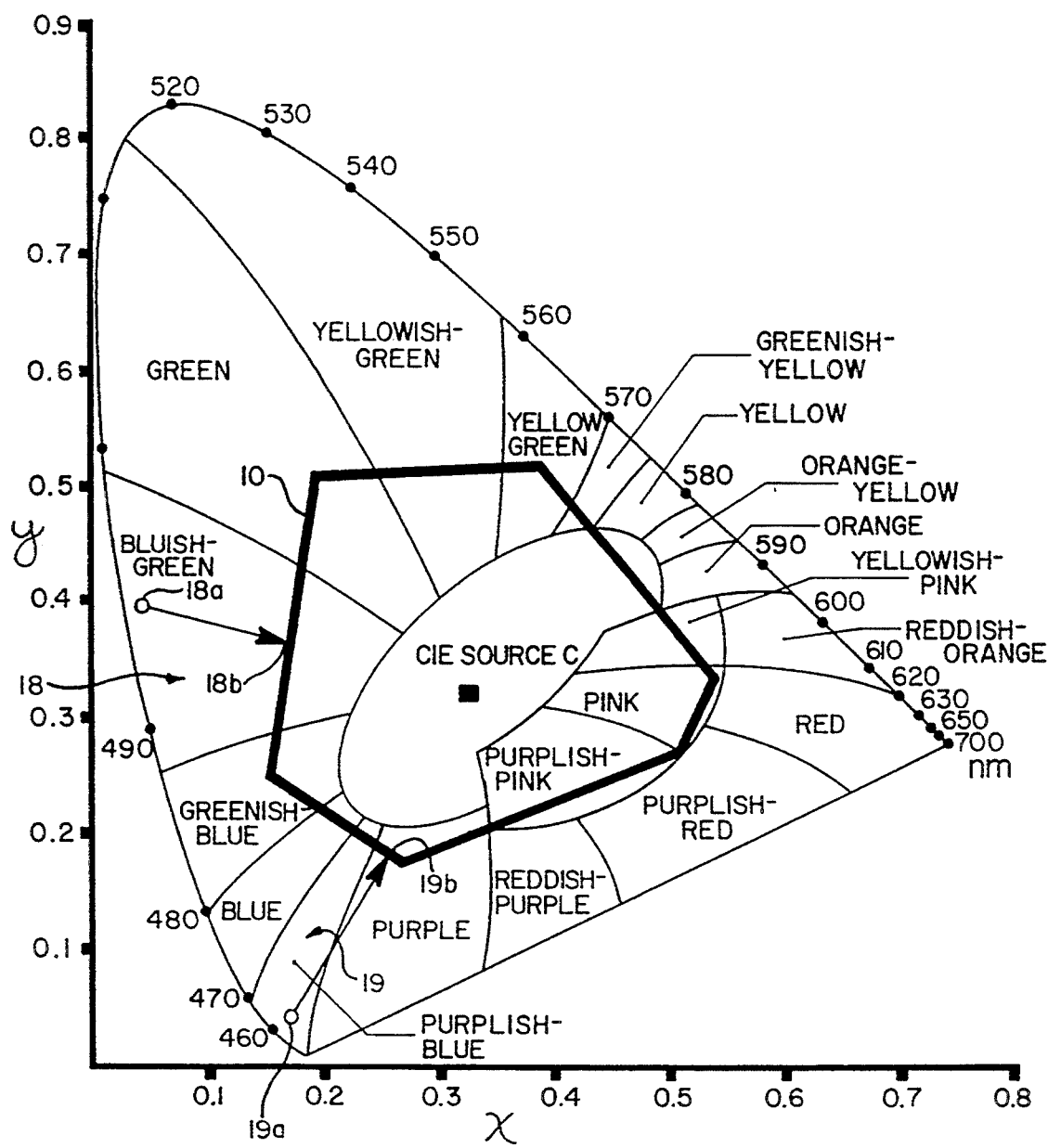
FIG. 2 is a chromaticity diagram showing the curved constant color lines that characterize the Abney effect.

In step S513, the hue angles in the printer table and in the border table are warped so as to compensate for the Abney effect. More specifically, the CMY values for out-of-gamut colors that are currently stored in the printer table and the border tables are all based on constant hue angle extension as described in connection with step S508. However, as shown in FIG. 2, for highly saturated colors, constant hue angle extension back to the printer gamut edge can result in a change in perceived hue, in accordance with the Abney effect. For example, as described above, constant hue angle extension changes the hue of highly saturated (but unprintable) purplish-blue color 19a to a less-saturated purple color on the printer gamut edge as shown at 19b.

To compensate for this effect, the hue angles in the printer table and in the border table are warped. More particularly, for both the printer table and the border table, the CMY values for one hue angle are transferred to another, different, hue angle so as to preserve perceived hue of the printing color. This warping is illustrated in FIG. 14 and 15 for the blue/purple region of color space which lies at a hue angle θ of between $\theta = 255°$ to $\theta = 333°$.

Figure 14:
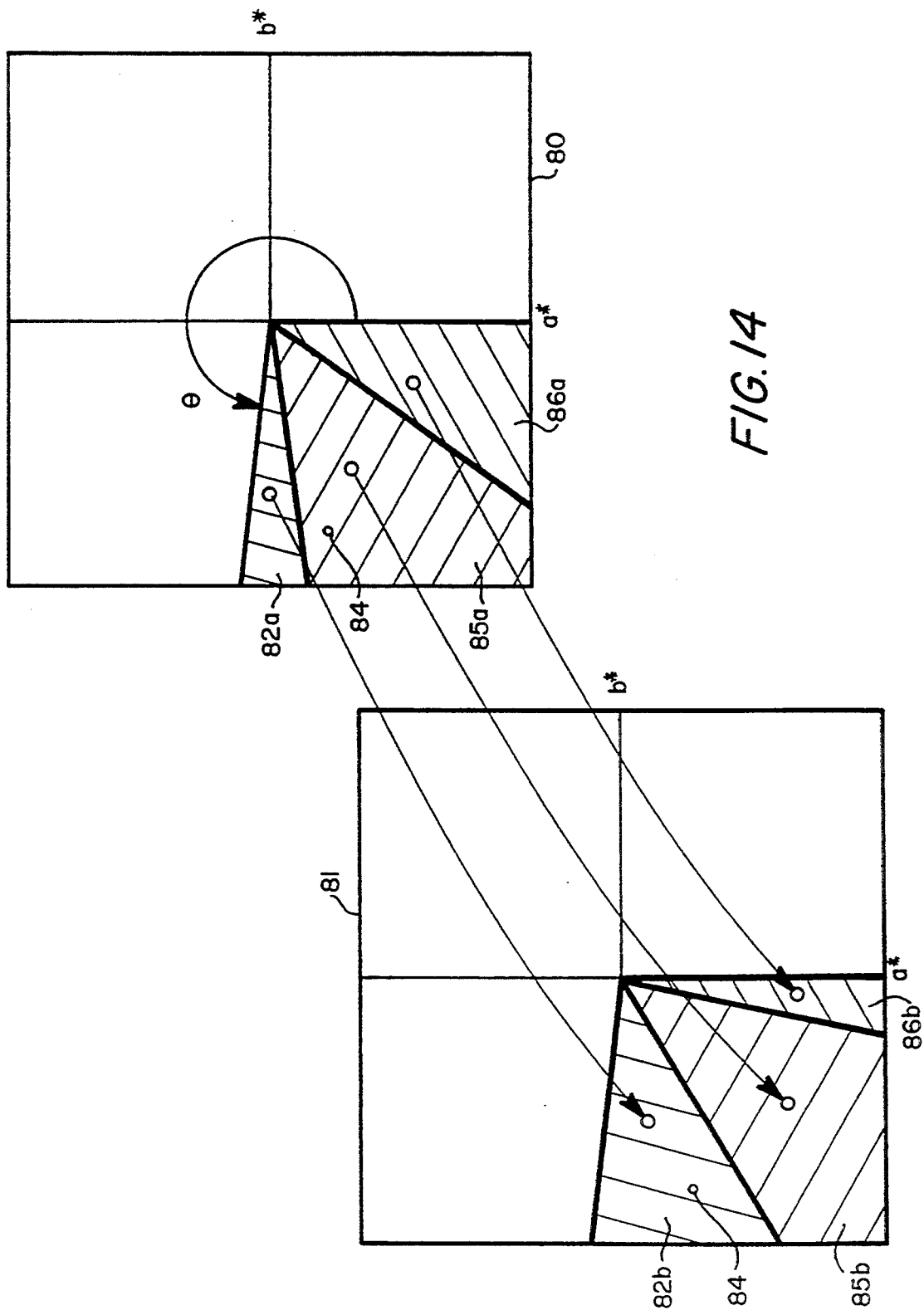
FIG. 14 shows how hue angles are warped for printer tables and FIG. 15 shows how hue angles are warped for border tables.
Figure 15:
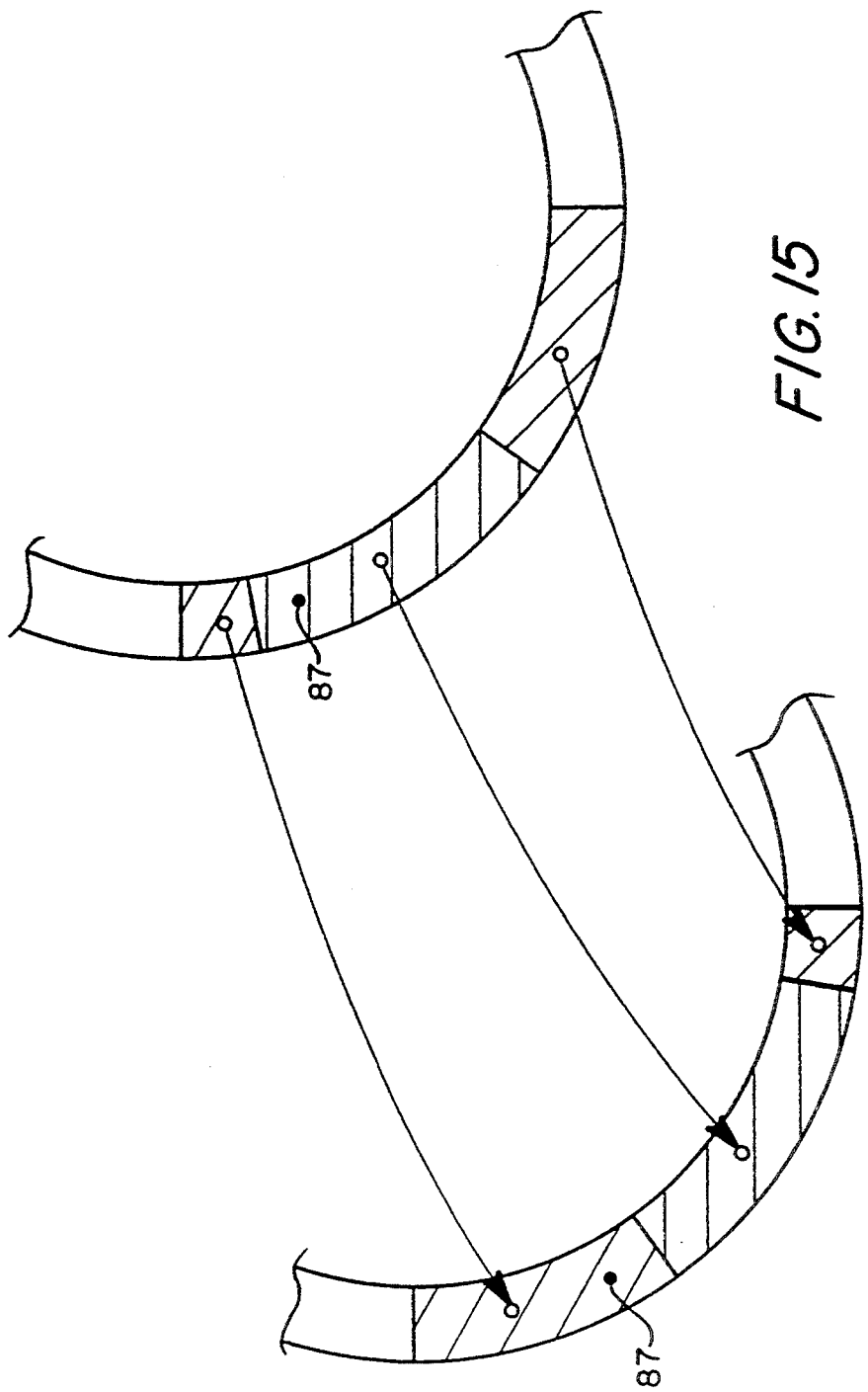

FIG. 14 shows a printer table 80 before warping and the same printer table 81 after warping. The printer tables illustrated in FIG. 14 are for arbitrary printer tables in the a*, b* plane and for an arbitrary luminance value L*, and it should be understood that the warping shown in FIG. 14 is carried out for each of the printer table for the L* values selected in step S503. As shown in FIG. 14, blue region 82a is stretched into warped blue region 82b. More particularly, each of the CMY values in region 82a is stretched into corresponding warped regions in 82b. This ensures that the CMY values that are printed in response to a command to print a highly saturated out-of-gamut blue color yield a blue hued color rather than a purplish-blue color. For example, highly saturated out-of-gamut blue color 84, if printed according to the unwarped table 80 would yield a purplish-blue color while when printed according to warped table 81 yields a blue color.

Additional hue angle warpings map the CMY values from region 85a into region 85b and map CMY values from region 86a into region 86b. The precise mappings are given as follows:

For hue angles between 255° and 305°:
warped_angle [255+ang]=255+0.5*ang (where $0 < ang < 50°$)

For hue angles between 305° and 309°:
warped_angle [305+ang]=280+1.25*ang (where $0 < ang < 4°$)

For hue angles between 309° and 333°:
warped_angle [309+ang]=285+2*ang (where $0 < ang < 24°$)

Thus, the unwarped region from 255° to 280° is warped by stretching into the region 255° to 305°, the unwarped region from 280° to 285° is warped by compressing into the region from 305° to 309°, and the unwarped region from 285° to 333° is warped by compressing into the region from 309° to 333°. The warped regions remain continuous, however, and they have the same end points as the unwarped regions (here 255° and 333°).

Similar warpings are carried out in the red and cyan regions. For red, the warpings are:

For hue angles between 10° and 40°:
warped_angle [10+ang]=10+0.5*ang (where $0 < ang < 30°$)

For hue angles between 40° and 53°:
warped_angle [40+ang]=25+1.25*ang (where $0 < ang < 12°$)

For hue angles between 52° and 76°:
warped_angle [52+ang]=40+1.5*ang (where $0 < ang < 24°$)

Thus, the unwarped region from 10° to 25° is warped by stretching into the region 10° to 40°, the unwarped region from 25° to 40° is warped by compressing into the region from 40° to 52°, and the unwarped region from 40° to 76° is warped by compressing into the region from 52° to 76°.

For cyan, the warpings are:

For hue angles between 170° and 195°:
warped_angle [170+ang]=170+2.0*ang (where $0 < ang < 25°$)

For hue angles between 195° and 245°:
warped_angle [195+ang]=220+0.5*ang (where $0 < ang < 50°$)

Thus, the unwarped region from 170° to 220° is warped by compressing into the region from 170° to 195°, and the unwarped region from 220° to 245° is warped by stretching into the region from 195° to 245°.

The same warping that is carried out on the printer tables is also carried out on the border tables as shown in FIG. 15. Like before, this ensures that a request to print an out-of-gamut blue color, such as color 87, which would be printed as a purplish-blue hue if printed according to the unwarped border table, will result in a blue-hued color when printed according to the warped border table.

With the warping described above, color smoothness in the printer table and in the border table is preserved since both in-gamut and out-of-gamut colors are both warped. While it is possible to warp only out-of-gamut colors, this would result in an undesirable color discontinuity at the printer gamut edge. Moreover, even though the in-gamut colors are warped and hence are distorted, it has been confirmed experimentally that the amount of distortion is relatively insignificant because the hue angle rays are close together for colors in the printer gamut and are further apart for higher saturation out-of-gamut colors.

The above-described warping technique warps all color at the same hue angle equally regardless of the saturation of the colors. It is also possible to introduce a saturation-dependent warping factor, whereby more highly saturated colors are warped more than relatively less saturated colors.

In step S514, colors in the yellow region of the printer and border tables are adjusted so as to widen the yellow region. More particularly, as shown in FIG. 2, pure yellow colors for the printer fall into a very narrow range of the printer gamut that has been found to be difficult for users to find (the range of monitor yellow colors is greater). Because the range of pure yellow printer colors is so narrow, a user typically obtains a greenish-yellow rather than the desired pure yellow color. Thus, in step S514, the yellow region is widened. Conveniently, yellow widening is obtained through hue angle warping as follows:

For hue angles between 87° and 90°:
warped_angle [87+ang]=87+1.25*ang (where $0 < ang < 4°$)

For hue angles between 91° and 97°:
warped_angle [91+ang]=92 (where $0 < ang < 6°$)

For hue angles between 97° and 112°:
warped_angle [97+ang]=92+0.5*ang (where $0 < ang < 15°$)

For hue angles between 112° and 132°:
warped_angle [112+ang]=99.5+1.25*ang (where $0 < ang < 20°$)

For hue angles between 132° and 147°:
warped_angle [132+ang]=124.5+1.5*ang (where $0 < ang < 15°$)

A computer program for automatically performing the foregoing steps S501 through S514 has been developed and is attached hereto in the form of a microfiche appendix.

What is claimed is:

1. A color printer look-up table for providing color primary values corresponding to colors in device-independent color space, the color primary values having warped hue angles which compensate for the Abney effect.

2. A color printer look-up table according to claim 1, wherein the colors in device-independent color space correspond both to colors within the color printer gamut and to colors out of the color printer gamut.

3. A color printer look-up table according to claim 2, wherein the color primary values are warped for the out-of-gamut colors.

4. A color printer look-up table according to claim 3, wherein the color primary values are increasingly warped for increasingly saturated colors.

5. A color printer look-up table according to claim 3, wherein the color primary values are warped for colors both within the printer gamut and for colors out of the printer gamut.

6. A color printer look-up table according to claim 1, wherein the hue angles are warped so as to stretch the hue angle in the blue region and so as to compress the hue angle in the purplish-blue and the purple region.

7. A color printer look-up table according to claim 1, wherein the hue angles are warped so as to compress the hue angles in the bluish-green region and so as to stretch the hue angles in the greenish-blue region.

8. A color printer look-up table according to claim 1, wherein the hue angles are warped so as to stretch the hue angles in the red region and so as to compress the hue angles in the reddish-orange region.

9. A color printer look-up table according to claim 1, wherein the yellow region is expanded.

10. A color printer driver comprising:
a printer table for providing color primary values corresponding to colors within the color printer gamut and for colors outside the color printer gamut, the color primary values outside the color printer gamut having warped hue angles whereby the Abney effect is compensated;
means for accepting a command for printing a designated color; and
control means for extracting from the printer table the color primary values corresponding to the designated color.

11. A color printer driver according to claim 10, wherein the hue angles for colors within the color printer gamut are also warped whereby color smoothness for the colors in the printer table is preserved.

12. A color printer driver according to claim 11, wherein the color primary values are increasingly warped for increasingly saturated colors.

13. A color printer driver according to claim 11, wherein the hue angles are warped so as to expand the hue angle in the blue region and so as to compress the hue angle in the purplish-blue and the purple region.

14. A color printer driver according to claim 11, wherein the hue angles are warped so as to compress the hue angles in the bluish-green region and so as to stretch the hue angles in the greenish-blue region.

15. A color printer driver according to claim 11, wherein the hue angles are warped so as to stretch the hue angles in the red region and so as to compress the hue angles in the reddish-orange region.

16. A color printer driver according to claim 11, wherein the yellow region is expanded.

17. A color printer driver according to claim 10, further comprising a border table for providing color primary values for colors outside the printer table, and wherein said control means selects the printer table or the border table in accordance with whether the designated color is within the printer table or outside the printer table, and extracts the color primary values from the selected one of the printer table and the border table.

18. A color printer driver according to claim 17, wherein warping of the printer table is the same as warping of the border table.

19. A color printer driver according to claim 17, wherein the border table is arranged in a wheel-like arrangement of cells centered on the lightness axis.

20. Apparatus for color printing comprising:
a color printer for printing color images in response to color primary commands, said color printer having a gamut of printable colors;
a color monitor for displaying colors within a gamut of displayable colors;
a processing unit including a computer for executing stored program process steps, said processing unit including a color monitor interface for providing color primary values to said color monitor and a color printer interface for providing color primary values to said color image forming means; and
a memory for storing process steps for execution by said processing unit;
said process steps including steps to derive a color image, to provide color primary values via said color monitor interface to said color monitor in correspondence to said color image, and to provide color primary values via said color printer interface to said color printer in correspondence to said color image, wherein for colors outside the gamut of printable colors the hue angles are warped such that the hue of displayed images is perceived the same as the hue of printed images.

21. Apparatus according to claim 20, wherein said memory stores a printer table for providing color primary values corresponding to colors in device-independent coordinate space, the color primary values having hue angles that are warped, and wherein said process steps include steps to derive device-independent color coordinates for the color image and to provide the color primary values corresponding to the device-independent color coordinates to the color printer.

22. Apparatus according to claim 21, wherein the colors in device-independent color space correspond both to colors within the color printer gamut and to colors out of the color printer gamut.

23. Apparatus according to claim 22, wherein the color primary values are warped for the out-of-gamut colors.

24. Apparatus according to claim 23, wherein the color primary values are increasingly warped for increasingly saturated colors.

25. Apparatus according to claim 23, wherein the color primary values are warped for colors both within the printer gamut and for colors out of the printer gamut.

26. Apparatus according to claim 23, wherein the hue angles are warped so as to expand the hue angle in the blue region and so as to compress the hue angle in the purplish-blue and the purple region.

27. Apparatus according to claim 23, wherein the hue angles are warped so as to compress the hue angles in the bluish-green region and so as to stretch the hue angles in the greenish-blue region.

28. Apparatus according to claim 23, wherein the hue angles are warped so as to stretch the hue angles in the red region and so as to compress the hue angles in the reddish-orange region.

29. Apparatus according to claim 23, wherein the yellow region is expanded.

30. Apparatus according to claim 20, wherein said memory includes a border table for providing color primary values for colors outside the printer table, and wherein said processing unit selects the printer table or the border table in accordance with whether the designated color is within the printer table or outside the printer table, and extracts the color primary values from the selected one of the printer table or the border table.

31. Apparatus according to claim 30, wherein warping of the printer table is the same as warping of the border table.

32. Apparatus according to claim 30, wherein the border table is arranged in a wheel-like arrangement of cells centered on the lightness axis.

33. A method for building a printer table comprising:
determining a color printer gamut edge;
mapping color primary values into the printer table for colors within the color printer gamut edge;
mapping color primary values into the printer table for colors outside the color printer gamut edge; and
warping hue angles for the color primary values.

34. A method according to claim 33, wherein the color primary values are warped for the out-of-gamut colors.

35. A method according to claim 34, wherein the color primary values are increasingly warped for increasingly saturated colors.

36. A method according to claim 34, wherein the color primary values are warped for colors both within the printer gamut and for colors out of the printer gamut so as to preserve color smoothness.

37. A method according to claim 34, wherein the hue angles are warped so as to expand the hue angle in the blue region and so as to compress the hue angle in the purplish-blue and the purple region.

38. A method according to claim 34, wherein the hue angles are warped so as to compress the hue angles in the bluish-green region and so as to stretch the hue angles in the greenish-blue region.

39. A method according to claim 34, wherein the hue angles are warped so as to stretch the hue angles in the red region and so as to compress the hue angles in the reddish-orange region.

40. A method according to claim 34, wherein the yellow region is expanded.

41. A method according to claim 33, further comprising the step of mapping color primary values into a border table for providing color primary values for colors outside the printer table.

42. A method according to claim 41, wherein warping of the printer table is the same as warping of the border table.

43. A method according to claim 41, wherein the border table is arranged in a wheel-like arrangement of cells centered on the lightness axis.

* * * * *

UNITED STATES PATENT AND TRADEMARK OFFICE
CERTIFICATE OF CORRECTION

PATENT NO. : 5,438,649

DATED      : August 1, 1995

INVENTOR(S): Brigitte Ruetz

It is certified that error appears in the above-identified patent and that said Letters Patent is hereby corrected as shown below:

Column 1, line 16, change "(43)" to --(41)--.

Column 7, line 37, change "found°" to --found--.

Column 8, line 31, change "step $502." to --step S502.--;
        line 35, change "step $506" to --step S506--; and
        line 64, change "M = 18" to --M = 8--.

Column 10, line 34, change "step $512," to --step S512,--.

Column 12, line 40, change "90°:" to --91°:--.

Signed and Sealed this

Twelfth Day of December, 1995

Attest:

BRUCE LEHMAN

Attesting Officer    Commissioner of Patents and Trademarks